(12) United States Patent
Sattler et al.

(10) Patent No.: US 8,753,579 B2
(45) Date of Patent: Jun. 17, 2014

(54) PHOTOREACTOR

(75) Inventors: Christian Sattler, Bonn (DE);
Christian Jung, Troisdorf (DE);
Hans-Jürgen Bigus, Eberstadt (DE)

(73) Assignees: Deutsches Zentrum für Luft- und Raumfahrt e.V., Bonn (DE);
Hirschmann Laborgeräte GmbH & Co. KG, Eberstadt (DE)

( * ) Notice: Subject to any disclaimer, the term of this patent is extended or adjusted under 35 U.S.C. 154(b) by 1758 days.

(21) Appl. No.: 11/816,687

(22) PCT Filed: Feb. 16, 2006

(86) PCT No.: PCT/EP2006/060006
§ 371 (c)(1),
(2), (4) Date: May 27, 2008

(87) PCT Pub. No.: WO2006/087353
PCT Pub. Date: Aug. 24, 2006

(65) Prior Publication Data
US 2008/0299017 A1     Dec. 4, 2008

(30) Foreign Application Priority Data

Feb. 19, 2005   (DE) ............... 10 2005 007 771
Jan. 24, 2006   (WO) ............... PCT/EP2006/050400

(51) Int. Cl.
*B01J 19/08*     (2006.01)

(52) U.S. Cl.
USPC ............ 422/186.3; 422/186; 204/157.15;
204/158.2; 138/37; 138/38; 138/42; 138/44;
236/589; 236/601

(58) Field of Classification Search
CPC .... B01F 5/0688; B01F 5/0682; B01J 19/053;
B01J 19/12; C02F 1/30
USPC ............ 422/186.3, 186; 204/157.15, 158.3;
138/37, 39, 42, 44; 236/589–601
See application file for complete search history.

(56) References Cited

U.S. PATENT DOCUMENTS 3,554,887 A * 1/1971 Feehs ................. 204/158.11
4,296,066 A * 10/1981 Schenck ................. 422/24
(Continued)

FOREIGN PATENT DOCUMENTS

CH       266 090       1/1950
EP       0 936 188     8/1999
(Continued)

OTHER PUBLICATIONS

Lovergrove K et al.: "Endothermic Reactors for an Ammonia Based Thermo-chemical Solar Energy Storage and Transport System," Solar Energy, Pergamon Press. Oxford, GB Bd. 56, NR. 4, Apr. 1996.

*Primary Examiner* — Xiuyu Tai
(74) *Attorney, Agent, or Firm* — Renner, Otto, Boisselle & Sklar, LLP

(57) ABSTRACT

The photoreactor comprises a tube bundle (10) made up of numerous capillary tubes (11) through which a reaction medium flows. The tubes (11) are transparent. Solar radiation or artificial radiation acts upon the reaction medium for effecting a photochemical or photobiological treatment. The inlet chamber (12) connected with the tube bundle (10) comprises a flow distributor (16) which distributes the reaction medium from the fluid inlet (15) to the tubes (11). The flow distributor (16) allows for a smaller volume of the inlet chamber (12). The reactor volume, which is not irradiated, is thus reduced, and the efficiency of the rector is enhanced.

14 Claims, 1 Drawing Sheet

(56) References Cited

U.S. PATENT DOCUMENTS

| | | | |
|---|---|---|---|
| 4,456,512 A * | 6/1984 | Bieler et al. | 204/157.65 |
| 6,299,844 B1 * | 10/2001 | Tao et al. | 422/186 |
| 2001/0043890 A1 * | 11/2001 | Son | 422/174 |
| 2002/0198429 A1 * | 12/2002 | Ramani et al. | 585/658 |
| 2003/0116438 A1 * | 6/2003 | Yamazaki et al. | 204/601 |

FOREIGN PATENT DOCUMENTS

| | | |
|---|---|---|
| GB | 515 669 | 12/1939 |
| WO | 2004/031078 | 4/2004 |

* cited by examiner

PHOTOREACTOR

The invention relates to a photoreactor comprising radiation-permeable tubes through which a reaction medium is adapted to flow and which are irradiated with light from outside, wherein the tubes extend from an inlet chamber having a fluid inlet.

BACKGROUND

For detoxification and/or degermination of fluids contaminated by pollutants or microorganisms, photochemical or photobiological processes are developed. In all these processes oxygen-rich species, such as singlet oxygen, hydroxyl or other oxygen-rich radicals or other strongly oxidizing intermediates, are produced by photonic excitation, which species effect a decomposition and/or deactivation of the pollutants and/or microorganisms.

Examples are the photonic activation of reagents, such as hydrogen peroxide or caroat, or photocatalytic processes, such as the semiconductor photocatalysis, using titanium dioxide, for example, or the light-amplified Fenton reaction (photo Fenton reaction).

For accomplishing this task, solar energy is used besides electrical light sources, such as gas discharge lamps, incandescent lamps, fluorescent lamps, light emitting diodes or tubes, excimer radiators and lasers. However, the non-solar light sources offer low efficiencies at moderate investment costs, which results in high costs for both the required electrical energy and cooling processes. Further, the illuminants are comparably expensive and have a short service life. The high illuminant temperatures produced during operation, the high electrical voltages and power as well as the frequently used toxic constituents, such as mercury vapor, further entail a high expenditure for safety equipment.

Besides the better sustainability of the light source mentioned last, financial incentives in addition to the ecological incentives may be an inducement to use solar energy in view of the comparably lower operating costs of solar plants.

Various receiver reactor concepts are presented concerning the use of the sun as a light source for the aforementioned fields of application.

In DE 198 44 037 A1 a flatbed receiver reactor for solar-photo and solar-thermochemical syntheses is described. In particular at high concentrations or high extinction coefficients of the dissolved substances or in the case of strongly turbid fluids, such as emulsions or suspensions, the use of such reactors with comparably thick fluid layers is disadvantageous. The penetration depth of the light into the reaction mixture is very small due to the light absorption according to the Lambert Beer law and due to light scattering at the particles and/or droplets.

Falling film reactors have been put to test with a view to solving this problem, among others (D. Bahneman, M. Meyer, U. Siemon, D. Mencke, A Self-Sufficient PV Powered Solar Detoxification Reactor for Polluted Waters, Proc. Int. Sol. Energy Conf. Solar Engineering—1997, Apr. 27-30, 1997, ASME, Washington D.C., 261-267; B. Braun, J. Ortner, K.-H. Funken, M. Schäfer, C. Schmitz, G. Horneck, M. Fasdni, Dye-Sensitized Solar Detoxification and Disinfection of Contaminated Water, Proc. $8^{th}$ Int. Symp. Solar Thermal Concentrating Technologies, Vol. 3, C. F. Müller Verlag, Heidelberg (1997) 1391-1401). It is a drawback of the falling films that they require large covers which are expensive to produce. Further, much energy is consumed for repeatedly pumping the reaction mixture across the falling film surface. The use of falling films open to the atmosphere was demonstrated, but in this case low-boiling substances are uncontrollably released into the atmosphere.

Multi-ribbed plate reactors which do not concentrate light, in particular double-ribbed plate reactors made of an extruded translucent plastic material (EP 0 738 686 A1) and so-called CPC reactors (compound parabolic collectors) (for example J. I. Ajona, A. Vidal, The Use of CPC collectors for Detoxification of Contaminated Water; Design, Construction and Preliminary Results, Solar Energy 68 (2000) 109-120), have been developed and put to test for solar detoxification of contaminated waste waters.

These reactor systems offer similar efficiencies (R. Dillert, R. Goslich, J. Dzengel, H.-W, Schuhmacher, D. Bahnemann, Field Studies of Solar Water Detoxification, Proc. $1^{st}$ User Workshop Training and Mobility of Researchers' Program at Plataforma Solar de Almeria, Nov. 18-19, 1997, Almeria, Spain, Ser, Ponencias, Madrid (1998) 31-40). However, it has turned out that the multi-ribbed plate reactors tend to foul to a considerable extent, and that their efficiency rapidly decreases as compared with that of CPC reactors. CPC-reactors are disadvantageous in that they require a reflector of complex configuration. Therefore the investment costs for this reactor technology are comparably high. Further, the reflectors may be subject to optical or mechanical degradation.

Line- and point-focusing concentrators have also been used for solar detoxification (DE 434 41 63 A1). However, these concentrators only utilize the direct radiation and not the diffuse radiation of the sun which contains a particularly large amount of UV light. Although the light concentration leads to more rapid concentration changes than non-concentrated sunlight, the reactor-related solar photon yield is comparably small, and the treatment costs are correspondingly high due to the comparably high investment costs.

In a photoreactor comprising transparent tubes, as described in DE 100 09 060 A1 of the present applicant, similar decomposition rates as those of CPC collectors were obtained without a combination with reflectors. Here, too, the ratio of the aperture to the size of the inner surface of the tube is disadvantageous. A corresponding increase may result in a further enhancement of the reactor-related photon yield.

A general drawback of the prior art is the very small reactor-related solar photon yield. In particular the scattering losses, which occur when suspensions of finely dispersed photocatalysts on the basis of titanium dioxide, for example, are used, result in an inefficient utilization of the emitted photons in the prior-art solar reactor configurations.

The known solar tube reactors are further disadvantageous in that they are operated at a high velocity with a turbulent flow for preventing sedimentation of turbid substances and/or suspended photocatalysts.

The agitation of the entire fluid flow at a high velocity results in a relatively high energy consumption for driving pumps. It would be of advantage to the economic efficiency and the ecobalance of a solar photoreactor plant if only a smaller portion of the fluid had to be placed in turbulence.

A photoreactor described in U.S. Pat. No. 4,456,512 A comprises an inlet chamber provided with a fluid inlet, from which inlet chamber a bundle of capillary tubes extends. The capillary tubes extend through a room in which a plasma is produced. The outer wall of this room is cooled. In the reaction fluid passing through the capillary tubes photochemical reactions take place.

A similar photoreactor is described in U.S. Pat. No. 3,554,887. Here, the tubes are connected with an inlet chamber and an outlet chamber. Inside the tube system a light source is arranged which produces the light required for the photoreaction.

SUMMARY OF THE INVENTION

The present invention provides a higher-efficiency photoreactor for photochemical or photobiological reactions, such as syntheses, cleaning, disinfecting and treatment operations.

More particularly, the present invention provides a photoreactor comprising radiation-permeable tubes through which a reaction medium is adapted to flow and which are irradiated with light from outside. The tubes extend from an inlet chamber provided with a fluid inlet and a flow distributor that distributes the reaction fluid from the fluid inlet to the tubes. The flow distributor is a bulkhead provided with holes arranged in an offset manner relative to the inlet ends of the tubes. Accordingly, the inlet chamber is provided with a flow distributor which distributes the reaction medium from the fluid inlet to the tubes.

The flow distributor allows for a smaller volume of the inlet chamber. Thereby the portion of the reaction medium volume, which is not irradiated, is reduced. Due to the small fluid portion which is not irradiated and thus does not react in terms of pure photoreactions, the processes induced by light lead to comparably more rapid material changes in the entire fluid and/or to more rapid concentration changes. Due to the smaller volume of the inlet chamber and the adjacent tubes, the volume of the overall photoreactor is small. The uniform distribution of the reaction medium to the tubes results in a high efficiency of the photoreactor since the fluid volume is smaller and the treatment intensity is enhanced. Further, the flow distributor decelerates the flow velocity in the tubes. If the tube inner wall is coated with a catalyst or any other material, said coating is washed off to a smaller extent due to the reduced flow velocity.

The flow distributor may further be configured as a static mixer for uniformly distributing auxiliary substances, such as photocatalysts, air, oxygen, hydrogen peroxide or other oxidants, to the tubes.

The flow distributor may be a plate around which a fluid flows, said plate being arranged between the fluid supply and the inlet ends of the capillaries. Preferably, the flow distributor is configured as a bulkhead provided with holes. Preferably, the holes are arranged in a offset manner relative to the inlet ends of the tubes.

According to a preferred embodiment of the invention, the tubes are capillary tubes and have a wall thickness of at least 10% of the inner diameter. The capillary tubes have an inner diameter of less than 10 mm. The use of capillary tubes results in a further reduction of the volume of the reactor or the reactor circuit.

Due to the use of capillary tubes and/or capillary tube bundles through which a fluid flows, portions of the emitted light do not impinge directly in the same collector plane upon the flowing fluid. This is due to the strongly increased ratio of the glass surface to the tube inner volume and/or the fluid volume as compared with the conventional solar photoreactors provided with transparent tubes. The capillary tubes with more and stronger glass walls per collector surface as compared with prior art thus act to an increasing extent as light conductors in deeper collector layers.

In the deeper capillary layers the light impinges upon the fluid which, in the prior art reactors, can interact only weakly or cannot interact at all with light. Further, the light backscattered from these deep layers is absorbed by capillaries placed on top of said layers in that said capillaries are irradiated from the rear. All in all, these effects allow the light emitted to the aperture to be utilized more efficiently by the capillary receiver than by the prior art receiver reactors.

The backscatter losses of the emitted light are thus smaller than in an assembly of conventionally dimensioned transparent tubes or the CPC collectors, and are in particular smaller than in the case of irradiation of a fluid surface, such as in a ribbed plate collector or a falling film reactor.

Thus it is possible to obtain, with the same irradiation of the aperture, thin fluid layers in which larger photon flows are achieved than in corresponding volume compartments of other photoreactors. Therefore more rapid concentration changes in the fluids are attained due to the photonic effect.

In particular when using solid photocatalysts, and in particular when using finely dispersed photocatalysts, or when irradiating other turbid fluids, where the damping of the light in the fluid is caused to a considerable extent by scattering besides the Lambert Beer absorption behavior, the light paths in the capillary receiver described above bring about an increased efficiency.

Besides the advantages obtained by irradiating turbid fluids, advantages may also be expected when irradiating clear fluids exhibiting a pure Lambert Beer light absorption behavior. Due to the considerably stronger effect, causing an expansion of the light beam, of the larger number of capillary tubes which are more strongly bent as compared with the prior art transparent glass tube reactors, the fluid volume is exposed to smaller photon flows at a comparable radiation. Since numerous photonically initiated reactions at larger photon flows become more inefficient due to mass transfer limits, for example, increases of the photon yields can be obtained even in clear fluids.

The use of capillary tubes allows for a larger inner surface of the reactor.

The application of photocatalytically active layers to the inside of the capillaries allows a larger catalyst surface per aperture to be applied than in prior art reactors. Further, the reactor can be operated at lower flow velocities such that a lesser extent of wear or a slower rate of wear or no wear at all of the coating is observed as compared with coated prior art reactors. The combination of flow distributors and capillary bundles effects in the necessary balancing of the flow velocities.

The use of capillaries allows the reactor, unlike prior art glass tube reactors, to be pressurized without particularly large wall thicknesses being required.

An increase of the oxygen partial pressure by pressurization (using air or oxygen) allows for an increase of the concentration of dissolved oxygen in the water to be treated (according to Henry's law). Pollutants dissolved in the water are thus considerably more rapidly photocatalytically decomposed than at normal pressure.

Thus, unlike prior art glass tube receivers, a capillary receiver can be considerably more efficiently operated by pressurization with oxygen and/or air. For this purpose, oxygen pressures of 1-20 bars, and preferably 1-15 bars are applied.

Due to the combination with the flow distributor, which balances the flow velocities in the reactor tubes, a pressurized capillary receiver allows particularly large material changes to be obtained during a single passage of the waste water through the reactor.

Within the purview of the present invention, the term "capillary tube" relates to tubes with an inner diameter of less than 10 mm and a wall thickness preferably amounting to 10% of the inner diameter. Such capillary tubes allow a larger inner surface of the reactor relative to the liquid volume to be obtained. The thicker glass walls may act as light conductors.

Preferably, the capillary tubes are combined to form an elongate tube bundle which extends between an inlet chamber and an outlet chamber. Thereby numerous thin fluid layers are produced which are efficiently supplied with light. The scattered radiation occurring in the case of turbid fluids is captured by adjacent capillary tubes. The numerous thin fluid layers are more efficiently supplied with light. The capillary tubes allow for an operation at an overpressure of typically at least 8-20 bars. Due to the beam expansion at the inner surfaces smaller photon flows are fed such that a higher photon yield may be expected even in the case of clear fluids.

The inner diameter of the capillary tubes is preferably 1-10 mm, and more preferably 1-5 mm. The wall thickness of the capillary tubes is preferably 0.1-5 mm, and more preferably 0.1-3 mm. The ratio of the outer diameter to the inner diameter of the capillary tubes ranges between 20:1 and 1:1.

The length of the capillary tubes is preferably 10-250 cm, in particular 40-180 cm, and most preferably 100-150 cm.

In one mode of operation, the capillary tubes are connected in parallel to a fluid supply system through which a turbulent flow passes, and guide the fluid passing through the system as a laminar flow at a lower flow velocity. Thereby the pressure drop and thus the energy required for operating pumps are kept at a low level. A turbulent mixing of the fluids in the supply system is ensured. When using capillary tubes above the known reactor tubes having a large cross section, it is particularly advantageous that a smaller fluid volume must be subjected to a turbulent movement at a high energy input and is thus mixed.

According to one embodiment of the reactor, the bottom of the capillary receiver is configured as a mirror. This reduces the required number of capillary layers for attaining a complete light absorption, and further enhances the irradiation of the rear sides of the capillary tubes. The risk of fouling, in particular microbial fouling, is thus reduced.

According to another embodiment, illuminants, such as gas discharge lamps, incandescent lamps, fluorescent lamps or tubes, light emitting diodes, excimer radiators or lasers or light conductors, are arranged below the lowermost capillary tube layer or within the capillary tube layer for coupling in radiation from the illuminant or sunlight with or without a combination with diffusers for the purpose of realizing a hybrid operation, i.e. operation optionally with solar energy or with the artificial illuminant.

Another embodiment relates to embedding of electrical fields between the capillaries by means of electrodes. Here, constant or slower alternating fields may be used for supporting the photochemical charge separation in semiconductor materials. Preferably, the electrical fields can be generated by introducing electrodes into the capillaries, or by producing the capillaries from a transparent electrode material, or by applying an outer and/or preferably an inner coating of a transparent electrode material to the capillaries, in combination with a counter electrode located inside or outside the capillary.

Another combination with electrical fields can be obtained by introducing cathodes and anodes into the inlet and/or outlet chamber. In situ oxidants, such as hydrogen peroxide, may be produced at the electrodes by cathodic reduction of oxygen or chlorite by anodic oxidation of chloride. In particular, the flow distributor may be configured as a large-surface electrode, and a small-surface counter electrode can be arranged between the flow distributor and the capillaries, for example, in the form of a quasi-split electrochemical cell. This allows a precise in-situ dosing and distribution of any required oxidant.

According to another embodiment, the voltage required for operating the electrodes is obtained through photovoltaic modules arranged below the capillaries in the bottom portion of the reactor.

One embodiment may comprise elastic perforated plates into which the ends of the capillaries are inserted. These capillaries are pressed against the inlet and/or outlet chamber with the aid of plates for obtaining a sealing surface between the chambers and the tubes.

The capillaries may further be sealed by casting them integral with/fusing them into a suitable plastic block which, in turn, is pressed into the inlet or the outlet chamber with or without sealing.

BRIEF DESCRIPTION OF THE DRAWINGS

Embodiments of the invention will now be described in greater detail with reference to the drawings in which.

DETAILED DESCRIPTION

Figure 1:
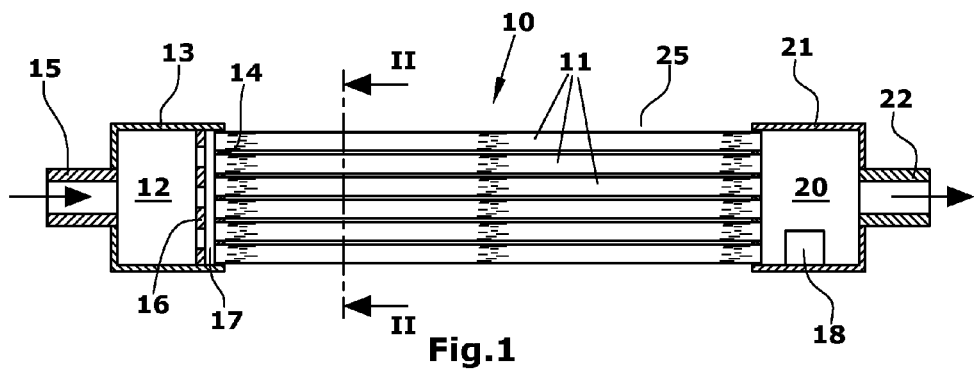
FIG. 1 shows a longitudinal section of a first embodiment of the photoreactor.
Figure 2:
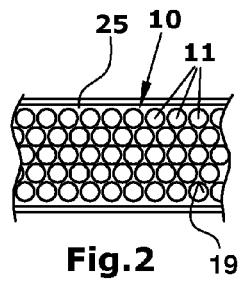
FIG. 2 shows a cross section along line II-II of FIG. 1.

The photoreactor shown in FIGS. 1 and 2 comprises a tube bundle 10 defined by numerous elongate parallel capillary tubes 11 made a of radiation-permeable material, in particular a transparent material, such as quartz glass. The representations in the drawings are not true to scale. They merely serve for explaining the general configuration.

The one ends of the capillary tubes 11 are connected to an inlet chamber 12. Said inlet chamber forms part of a housing 13 made of a plastic material, for example. The ends of the capillary tube bundle are potted into the front wall 14 of the housing 13 such that the front wall 14 seals the housing 13 towards the outside, wherein the inlet chamber 12 is in fluid connection with the capillary tubes. The inlet chamber 12 comprises a fluid inlet 15. In the inlet chamber 12 a flow distributor 16 is arranged. Said flow distributor is a plate or a bulkhead provided with holes. The flow distributor 16 causes a uniform pressure distribution to exist in a prechamber 17, to which the tube ends adjoin, such that a uniform flow through all tubes is obtained. Thus it is prevented that a fluid preferably flows through those tubes of the tube bundle which are arranged in the center of the bundle. The flow distributor 16 further causes the turbulent flow in the inlet chamber 12 to be converted into a nearly laminar flow. The flow distributor 16 allows for a smaller configuration of the inlet chamber 12. This results in a reduction of the volume which is not irradiated. The slower flow velocity ensures that a coating 19 provided at the inside of the capillary tubes 11 is not washed off.

At the opposite end of the tube bundle 10 the outlet chamber 20 is located. Said outlet chamber also comprises a housing 21 in whose front side the ends of the tubes are inserted via a sealing. The fluid leaves the outlet chamber 20 through the fluid outlet 22.

As can be seen in FIG. 2, the tube bundle 10 is made up of a plurality of layers of capillary tubes 11 arranged one on top of the other. In the present case, the capillary tubes 11 have a round cross section and are arranged in an alternating sequential manner in successive layers. The tubes may have any other cross-sectional shape, for example a square or hexagonal cross section. Preferably, the tubes are arranged closely to each other and may contact each other.

When the photoreactor is in operation, a fluid is guided through the capillary tubes of the tube bundle 10, while the tube bundle is subjected to solar radiation or an artificially generated radiation acting upon the tubes from outside, for example on the upper side 25 of the tube bundle 10. The radiation is refracted by the walls of the capillary tubes and distributed by the reaction medium. In this manner, the radiation is distributed into the interior of the tube bundle. At the bottom side of the tube bundle a reflector (not shown) may be located.

The tube bundle 10 comprising the inlet chamber 12 and the outlet chamber 20 defines a module which can be handled and installed as an entity. This allows numerous modules to be installed one beside the other thus creating an extensible photoreactor plant.

Figure 3:
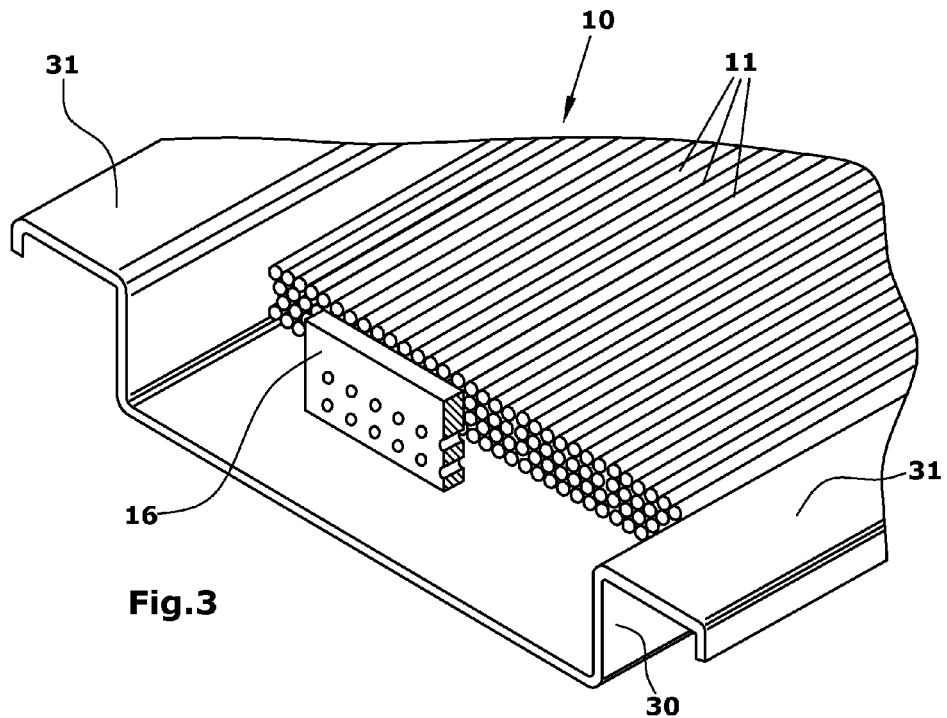
FIG. 3 shows a schematic cross section of a second embodiment.

In the embodiment shown in FIG. 3 the tube bundle 10 is arranged in a continuous trough 30 which comprises longitudinal hook sections 31 for hooking into corresponding holding fixtures. The trough 30 supports the capillary tubes over their overall length. The bottom of the trough as well as the side walls may be provided with a radiation-reflecting coating. It is further possible to produce the trough 30 from a transparent material for the purpose of illuminating said trough from the sides or from below.

The inlet chamber 12 and/or an outlet chamber 20 may comprise an electrode configured as a chloride-oxidizing anode, and another electrode configured as a cathode. The electrode in the outlet chamber 20 is diagrammatically shown at 18, and the flow distributor 16 may define the electrode in the inlet chamber 12.

What is claimed is:

1. A photoreactor comprising radiation-permeable tubes through which a reaction medium is flowable and which are irradiated with light from outside, wherein the tubes extend from an inlet chamber provided with a fluid inlet,
said inlet chamber including a flow distributor that distributes the reaction fluid from said fluid inlet to inlet ends of said tubes, and wherein the flow distributor is a bulkhead provided with holes that are arranged in an offset manner relative to said inlet ends of the tubes.

2. The photoreactor according to claim 1, wherein the tubes are capillary tubes having a wall thickness amounting to at least 10% of the inner diameter.

3. The photoreactor according to claim 1, wherein the tubes have a wall thickness amounts to at least 10% of the inner diameter.

4. The photoreactor according to claim 1, wherein the tubes define an elongate tube bundle extending between the inlet chamber and an outlet chamber, the dimension of said tube bundle being equal to or larger than a value of twice the outer diameter of one of the tubes as seen in the direction of light radiation.

5. The photoreactor according to claim 4, wherein the tubes are arranged in planar layers.

6. The photoreactor according to claim 4, wherein there is provided a mirror surface extending parallel to the tube bundle.

7. The photoreactor according to claim 4, wherein ends of the tubes are embedded in a wall of the inlet chamber and/or the outlet chamber.

8. The photoreactor according to claim 4, wherein inside or outside the tube bundle a radiation source is arranged which supplies the radiation required for the photoreaction.

9. The photoreactor according to claim 4, wherein the tube bundle as well as the inlet chamber and the outlet chamber are combined to form a self-supporting structure defining a module for use a larger solar treatment plant.

10. The photoreactor according to claim 1, wherein the inner surfaces of the tubes are provided with a coating.

11. The photoreactor according to claim 1, wherein the inlet chamber and/or an outlet chamber comprise an electrode configured as an oxygen-reducing cathode, and another electrode configured as an anode.

12. The photoreactor according to claim 1, wherein the inlet chamber and/or an outlet chamber comprise an electrode configured as a chloride-oxidizing anode, and another electrode configured as a cathode.

13. The photoreactor according to claim 11, wherein the flow distributor defines one of the electrodes.

14. The photoreactor according to claim 1, wherein the flow distributor is configured as a static mixer.

* * * * *